(12) United States Patent
Branco

(10) Patent No.: US 8,120,197 B2
(45) Date of Patent: Feb. 21, 2012

(54) WATER TURBINE FOR GENERATING ELECTRICITY

(76) Inventor: Anthony J. Branco, Naples, FL (US)

(*) Notice: Subject to any disclaimer, the term of this patent is extended or adjusted under 35 U.S.C. 154(b) by 489 days.

(21) Appl. No.: 12/317,345

(22) Filed: Dec. 22, 2008

(65) Prior Publication Data

US 2009/0115193 A1      May 7, 2009

Related U.S. Application Data

(63) Continuation-in-part of application No. 11/977,246, filed on Oct. 24, 2007, now Pat. No. 7,728,455.

(60) Provisional application No. 60/937,030, filed on Jun. 25, 2007.

(51) Int. Cl.
*F03B 13/00* (2006.01)

(52) U.S. Cl. ............................................. 290/54; 290/53

(58) Field of Classification Search ................ 290/53, 290/54; 416/245 A, 244 R; 415/4.1, 4.2, 415/4.3, 4.4
See application file for complete search history.

(56) References Cited

U.S. PATENT DOCUMENTS

| 4,140,433 | A | * | 2/1979 | Eckel | 415/209.1 |
|---|---|---|---|---|---|
| 7,528,498 | B2 | * | 5/2009 | Yeh | 290/55 |
| 2007/0009348 | A1 | * | 1/2007 | Chen | 415/2.1 |
| 2009/0115189 | A1 | * | 5/2009 | Lin | 290/43 |
| 2010/0066089 | A1 | * | 3/2010 | Best et al. | 290/52 |

* cited by examiner

*Primary Examiner* — Nguyen N Hanh

(57) ABSTRACT

An array 22 of water turbine assemblies 10 is positioned between two I-beams driven into the bed of a flowing water system. Each water turbine assembly 10 comprises a modular box-shaped housing 12 having an inlet and outlet for accelerating the flow of water therethrough. Turbine 14 has a ring gear 18 positioned about the periphery thereof in mechanical communication with a plurality of generators 20 for converting the kinetic energy of flowing water into electricity. Receiving means 16 are positioned and attached to the inlet and outlet of the housing 12 for collecting, concentrating, directing and accelerating water through the turbine 14 in the throat section 19 of each water turbine assembly 10. Each box-shaped modular housing 12 is structurally communicated with other housings 12 by interlocking mating surfaces 26.

10 Claims, 5 Drawing Sheets

WATER TURBINE FOR GENERATING ELECTRICITY

CROSS REFERENCE TO RELATED APPLICATIONS

This application is a continuation-in-part of my application Ser. No. 11/977,246 filed on Oct. 24, 2007 now U.S. Pat. No. 7,728,455 which in turn is based on Provisional Patent Application 60/937,030, filed on Jun. 25, 2007.

FEDERALLY SPONSORED RESEARCH none

SEQUENCE LISTING none

BACKGROUND OF THE INVENTION

This invention relates to water turbine technology and specifically to the utilization of the available kinetic energy present in the flowing water systems including rivers, streams and canals as well as kinetic energy available in the tidal movement of bays and oceans.

U.S. Pat. No. 4,317,330 (1982) to Brankovics shows the concept of providing a large structural installation having a catch basin formed by a dam wall and a plurality of water chutes each having gates to control the flow of water to a plurality of turbines positioned in each chute. This permanent structure requires a major initial outlay of resources and would take many years to implement.

U.S. Pat. No. 6,472,768 (2002) to Salls shows the concept of providing a portable submersible scoop like composite structure which funnels water to a turbine.

SUMMARY OF THE INVENTION

My invention solves the problem of the prior art by providing a modular box-shaped housing having interlocking mating surfaces having a novel turbine structure positioned therein which accelerates the flow of water therethrough.

My invention also provides a novel water turbine assembly having an inlet and outlet for accelerating water through a throat section thereof and thereby utilizing this accelerated flow of water to drive the water turbine and a plurality of generators for generating electricity. Each unit is sized to be mobile and easily positioned in a flowing water system such as a river, stream, canal, tidal bay or ocean.

My invention is bi-directional and can be utilized in tidal areas where the flow of water reverses.

My invention also provides a means for supporting a single box shaped housing or a plurality of box shaped housings within a flowing water system by means of vertically oriented I-beams. Means are also provided for easy removal of each unit for maintenance and replacement. This design lends itself to a structure of a plurality of water turbine units in an array which forms a mini-grid or hydroelectric power plant without the need, cost, and environmental impact associated with or required for a hydro-electric dam.

The advantages of the invention will become apparent from the study of the following description and the accompanying drawings. It should be understood that variations may be made in the details and general features of the design concept without departing from the spirit and scope of the invention. For example, the design of the instant invention could be implemented in a river, a stream, in a canal or in the ocean and the various configurations of the water turbine assembly would be determined by environmental considerations.

DETAILED DESCRIPTION OF THE PREFERRED EMBODIMENT

Figure 1:
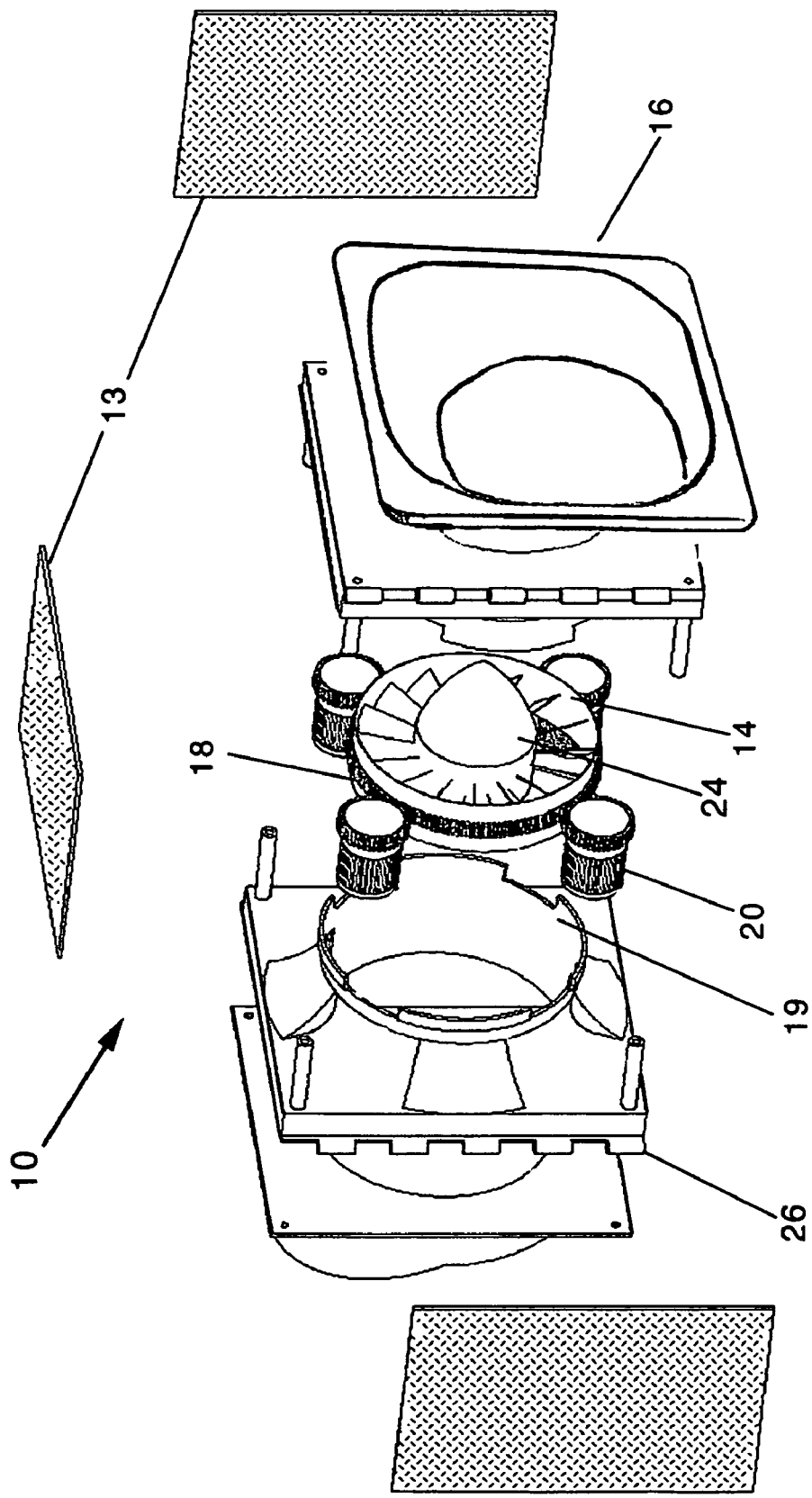
FIG. 1 is an exploded view of the water turbine assembly of the present invention.

FIG. 1 is an exploded view of water turbine assembly 10 of the present invention. Turbine 14 is supported and positioned within the throat section 19 of the self supporting box-shaped modular housing 12. Attached to the periphery of the turbine 14 is a ring gear 18 which is in mechanical communication with a plurality of generators 20. This mechanical communication between the ring gear 18 and the generators 20 can take the shape of many well know expediencies within the purview of a person having ordinary skill in the art. Receiver means 16 are positioned and attached to the inlet and outlet of housing 12. Receiver means 16 is designed to collect, concentrate and direct water through the throat section 19 at an accelerated rate. Nose cone 24 mounted on the turbine directs the accelerated water to the distal ends thereof so that maximum torque is transferred to the turbine for producing optimum energy for any given water flow rate. As the water enters the housing 12, the cross sectional area is reduced as it passes from the receiving means 16 through the throat section 19 and radially outwardly from the nose cone 24. The accelerated water flow rate rotates the turbine 14 and this rotational motion is converted into electricity by the generators 20. Access or cover panels 13 provide the top section, the bottom section and side sections which when assembled with turbine assembly 10 encapsulates the water turbine assembly of the present invention. It should be noted that the turbine assembly 10 as shown in FIG. 1 is designed such that water entering the assembly from one direction will generate electricity and when the water is flowing from the opposite direction and enters the turbine assembly 10 from the other side that electricity will also be generated. All of the moving parts of the turbine assembly 10 are enclosed in housing 12. The materials used would be dependent upon the parameters required for a particular turbine assembly implementation. It is contemplated that the materials used for all parts inside and out could be aluminum, titanium, stainless steel, PVC composite, ABS, UV-stabilized high density polyethylene (HDPE) or combinations thereof as well as brass or other non corrosive alloys.

Figure 2:
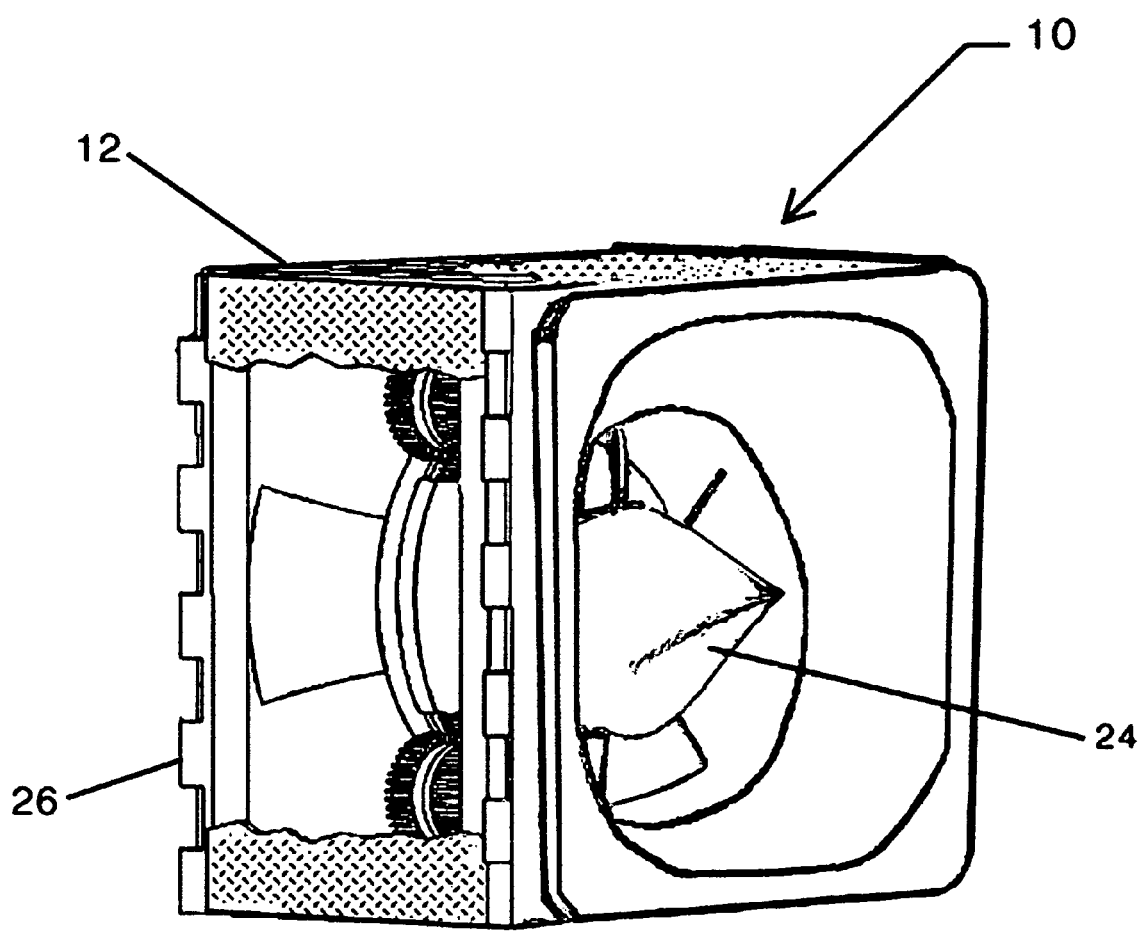
FIG. 2 is a perspective cutaway view of the water turbine assembly positioned in a self supporting box-shaped modular housing.

FIG. 2 is a perspective cutaway view of the present invention which shows the water turbine assembly 10 with panels 13 in place to form the box-shaped modular housing 12. Prefabricated mounting means 26 are provided so that a plurality of modular housings 12 can be fastened together to form an array of turbine assemblies 10 constituting a mini grid for generating electricity. These mounting means have interlocking mating surfaces 26 and features that allow the modular housings 12 to be joined and locked together forming a structurally sound multi-tiered bi-directional hydro-power plant.

Figure 3:
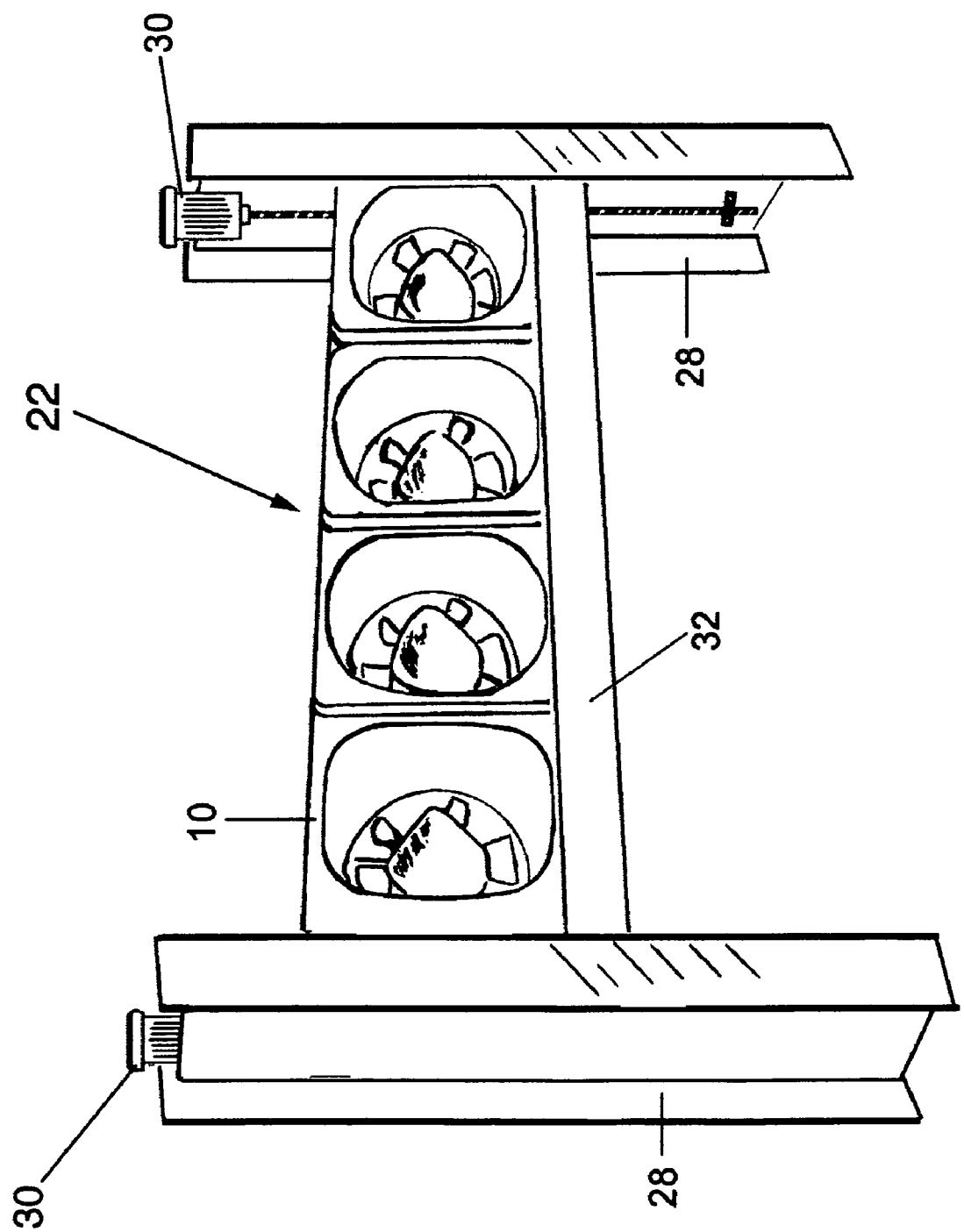
FIG. 3 is a perspective view of a plurality of water turbine assemblies arranged horizontally.

FIG. 3 is a perspective view of the structure for converting the kinetic energy of flowing water into electricity which shows a plurality of water turbine assemblies arranged horizontally between the I-beams and situated in the support track 32. Elevator motors 30 are positioned atop of the I-beams for raising or lowering the support track 32 with a plurality of water turbine assemblies 10 positioned thereon. This arrangement allows for ease of positioning of the support track 32 at the bottom of the flowing water system or at a level where maximum flow exists. The elevator motors 30 can be of any design which easily raises or lowers the support track and would be well known expediency to person having ordinary skill in the art.

Figure 4:
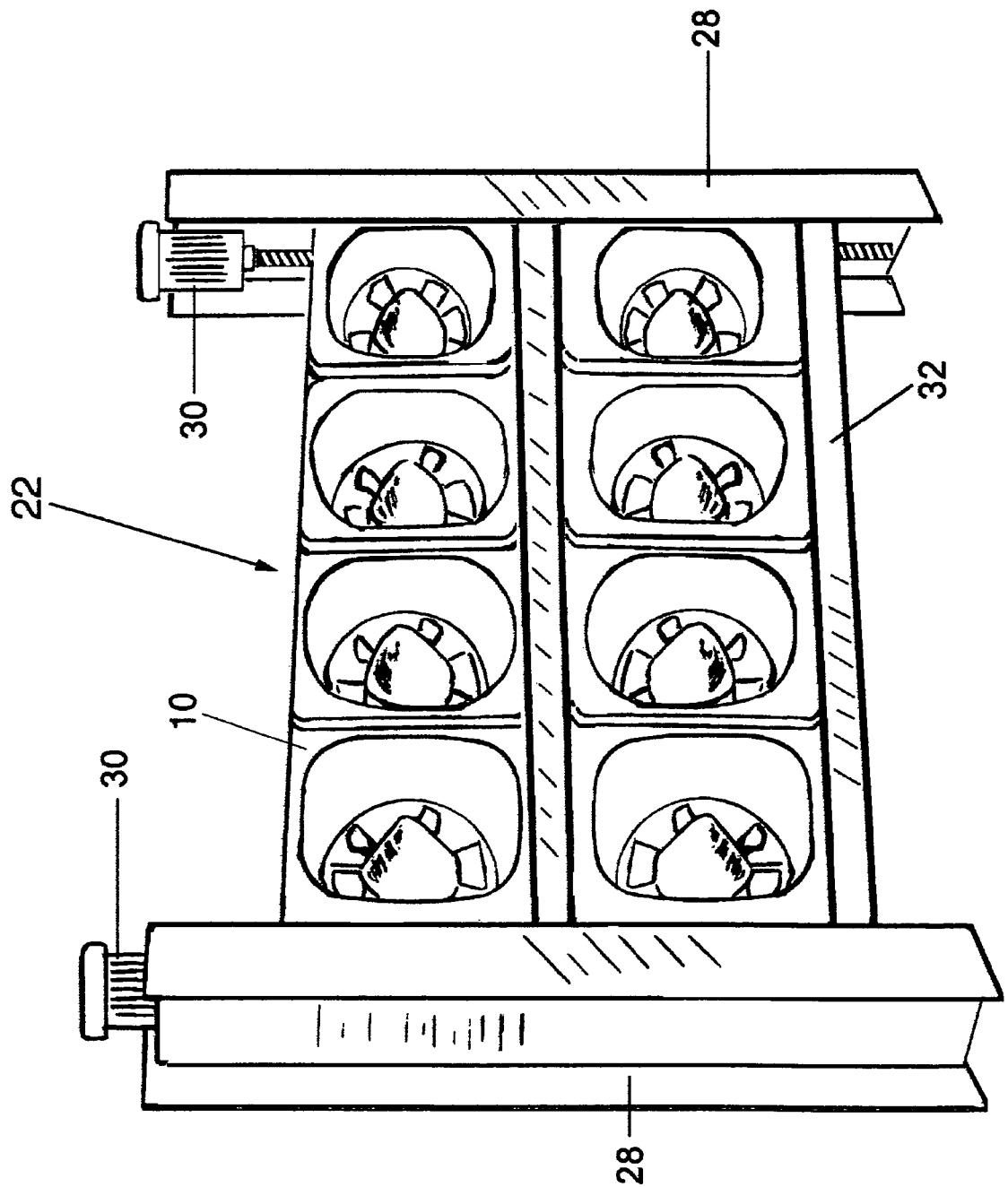
FIG. 4 is a perspective view of a plurality of water turbine assemblies arranged both vertically and horizontally to form an array or mini-grid.

FIG. 4 is a perspective view of the structure for converting the kinetic energy of flowing water into electricity wherein the water turbine assemblies 10 are shown both vertically and horizontally to form a mini-grid array or hydro-power plant. Due to their interlocking mating surfaces 26 each modular housing 12 are joined and locked together to form a structurally sound multi-tiered mini-grid or hydro-power plant.

Figure 5:
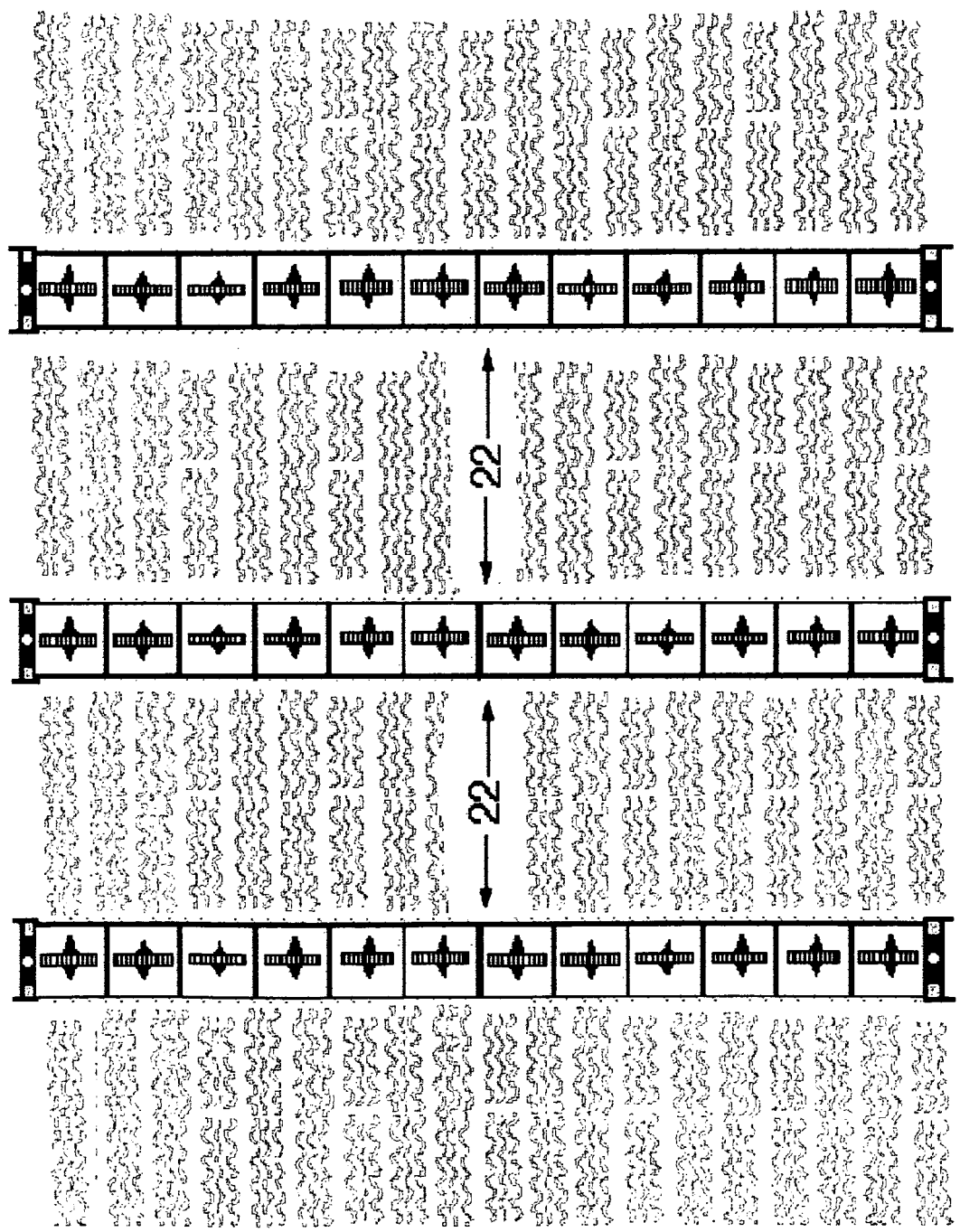
FIG. 5 is a top view of a plurality of arrays in a flowing water environment.

FIG. 5 shows a top view of a plurality of mini-grid arrays positioned in a flowing water system.

NUMERALS 10. turbine assembly
12. self supporting box-shaped modular housing
13. cover panels
14. turbine
16. receiver means
18. ring gear
19. throat section
20. generators
22. omni-directional arrays
24. nose cone
26. interlocking mating surfaces
28. I-beam
30. elevator motor means
32. support track

OPERATION

The water turbine assembly 10 operates to harness the kinetic energy from the flowing water in rivers, streams, canals, tidal bays, oceans to generate electricity. These water turbine assemblies 10 can be interconnected to form arrays 22 of mini-grids which harness the kinetic energy of the flowing water to drive multiple generators 20 to produce electricity. The bi-directional design of the water turbine assembly 10 is such that it can generate electricity when the water is flowing in either direction, and is therefore applicable to locations where the direction of tidal flow reverses during the course of the day during high demand peak load periods. This is also true of wave action in the ocean. The present invention is well suited for local non-grid connected power distribution as well as grid connected power distribution. Excess power generated during low demand periods will also be stored in batteries for later use.

The specific design of the water turbine assembly 10 is such that one revolution of the water turbine assembly 10 results in eighteen to twenty revolutions of the generator 20 with a direct drive interface or multiple times that with additional gears added. Generated power would be distributed by industry standard paralleling control switch gear that balances electric load to generated power. The electrical circuitry for controlling the flow of electricity from the generators 20 is standard "off the shelf" components including controllers, rectifies, synchronous inverters as would be well known to a person having ordinary skill in the art. Each modular water turbine assembly 10 can support up to four generators 20.

The invention claimed is:

1. A structure for converting the kinetic energy of flowing water into electricity comprising:
   at least two I-beams vertically positioned in a flowing water system and a support track positioned between said at least two I-beams, at least one water turbine assembly positioned in said support track, said water turbine assembly including a modular box-shaped housing having an inlet and outlet with a throat section positioned therebetween, a turbine positioned in said throat section, a ring gear positioned about the periphery of said turbine, a plurality of generators in mechanical communication with said ring gear, receiving means positioned and attached to said inlet and outlet for collecting, concentrating, directing and accelerating water through the turbine at the throat section, a nose cone positioned on said turbine for directing the accelerated water outwardly to the ends of the turbine so that maximum torque is transferred to the turbine whereby the rotational energy of the turbine is converted into electricity by the generators.

2. The structure according to claim 1, wherein the flowing water system is a member of the group consisting of rivers, streams, canals, tidal bays, oceans or other flowing water environments.

3. The structure according to claim 2, wherein at least two turbine assemblies are positioned vertically and wherein each modular box-shaped housing has interlocking mating surfaces to structurally connect each housing to create an array.

4. The structure according to claim 2, wherein at least two water turbine assemblies are positioned horizontally and wherein each modular box-shape housing has interlocking mating surfaces to structurally connect each housing to create an array.

5. The structure according to claim 3, wherein elevator means is positioned on top of each I-beam to lower and raise the support track containing the at least one water turbine assembly.

6. The structure according to claim 4, wherein elevator means is positioned on top of each I-beam to lower and raise the support track containing at least one water turbine assembly.

7. A structure for converting the kinetic energy of flowing water into electricity comprising: at least two I-beams vertically positioned in a flowing water system and a support track positioned between the at least two I-beams, at least one water turbine assembly positioned in said support track and elevator means positioned on top of each I-beam to lower and raise the support track containing said at least one water turbine assembly.

8. The structure according to claim 7, wherein the flowing water system is a member of the group consisting of rivers, streams, canals, tidal bays oceans or other flowing water environments.

9. The structure according to claim 8, wherein at least two water turbine assemblies are positioned vertically in said support track.

10. The structure according to claim 8, wherein at least two water turbine assemblies are positioned horizontally in said support track.

* * * * *